US005504072A

United States Patent [19]

Schmidl et al.

[11] Patent Number: 5,504,072
[45] Date of Patent: *Apr. 2, 1996

[54] ENTERAL NUTRITIONAL COMPOSITION HAVING BALANCED AMINO ACID PROFILE

[75] Inventors: Mary K. Schmidl, Arden Hills; Candis Kvamme, Brooklyn Park, both of Minn.

[73] Assignee: Sandoz Nutrition Ltd., Berne, Switzerland

[*] Notice: the term of this patent shall not extend beyond the expiration date of Pat. No.5, 438,042.

[21] Appl. No.: 387,038

[22] Filed: Feb. 10, 1995

Related U.S. Application Data

[63] Continuation of Ser. No. 134,226, Oct. 8, 1993, Pat. No. 5,438,042.

[51] Int. Cl.[6] .................. A61K 38/01; A61K 33/14; A23L 1/202; A23L 1/30
[52] U.S. Cl. ................ 514/21; 514/2; 424/439; 424/600; 424/679; 424/709; 426/62; 426/72; 426/73
[58] Field of Search .................. 514/2, 21, 773, 514/777; 424/439, 600, 709, 679; 426/64, 72, 73, 800, 801, 810

[56] References Cited

U.S. PATENT DOCUMENTS

| | | | |
|---|---|---|---|
| 3,697,287 | 10/1972 | Winitz | 426/73 |
| 3,698,912 | 10/1972 | Winitz | 426/656 |
| 3,701,666 | 10/1972 | Winitz | 426/311 |
| 4,414,238 | 11/1983 | Schmidl | 426/602 |
| 4,670,268 | 6/1987 | Mahmond | 426/72 |
| 4,737,364 | 4/1988 | Kalogris | 424/195.1 |
| 4,752,618 | 6/1988 | Mascioli et al. | 514/549 |
| 4,847,296 | 7/1989 | Babayan et al. | 514/552 |
| 4,921,877 | 5/1990 | Cashmere et al. | 514/866 |
| 5,053,387 | 10/1991 | Alexander | 514/2 |
| 5,221,668 | 6/1993 | Henningfield et al. | 514/23 |
| 5,231,085 | 7/1993 | Alexander et al. | 514/44 |

OTHER PUBLICATIONS

Tolerex Product Literature, Norwich–Eaton Pharmaceuticals, Norwich, N.Y. (1988).
Vivonex T.E.N. Product Literature, Norwich Eaton Pharmaceuticals, Inc., Norwich, N.Y. (1983).
High Nitroten Vivonex Product Literature, Norwich–Eaton Pharmaceuticals (1978).
Vivonex–T–E–N Product Literature, Sandoz Nutrition Corporation, Minneapolis, MN. (1992).
J. W. Alexander et al., Ann. Surg., vol. 192, pp. 505–517 (1980).
L. Dominioni et al., J. Burn Care Rehab., vol. 5, pp. 106–112 (1984).
Bower et al., Ann. Surg., vol. 203, pp. 13–20 91986).
Cerra et al., Ann. Surg., vol. 192, pp. 570–580 (1980).
Cerra et al., Surgery, vol. 91, pp. 192–198 (1982).
Cerra et al., Surgery, vol. 98, pp. 632–638 (1985).
D. Law et al., Ann. Surg., vol. 179, pp. 168–173 (1974).
L. Dominioni et al., Surg. Forum., vol. 34, pp. 99–101 (1983).
Food and Nutrition Board–National Research Council, Recommended Dietary Allowances, 10th Ed., Nat. Acad. of Sciences, pp. 66–67 (1989).
M. Donnelly et al., J. Cell Physiol., vol. 89, pp. 39–52 (1976).

Primary Examiner—Christina Y. Chan
Assistant Examiner—Nancy J. Degen
Attorney, Agent, or Firm—Robert S. Honor; Carl W. Battle

[57] ABSTRACT

Enteral nutritional composition comprising 4–30% lipid component, 65–80% carbohydrate component and 16–25% protein component, based on total caloric content, wherein said protein comprises by weight 14–30% glutamine and 5–33% arginine and said composition has a nonprotein calorie to grams of nitrogen ratio of 150:1 to 80:1.

17 Claims, No Drawings

ENTERAL NUTRITIONAL COMPOSITION HAVING BALANCED AMINO ACID PROFILE

BACKGROUND OF THE INVENTION

INFORMATION DISCLOSURE

This is a continuation of U.S. application Ser. No. 08/134,226, filed Oct. 8, 1993, now U.S. Pat. No. 5,438,042.

In general, enteral nutrition compositions may be administered orally or by tube feeding. Numerous enteral formulations are utilized in patients with a hypermetabolic state as effected by burns, trauma, surgery and in patients with malnutrition, chronic illness and in disorders resulting from prolonged periods of reduced oral intake resulting from cerebral vascular accidents or a comatose state.

The enteral compositions have provided benefits and advantages to parenteral nutrition. Elemental diets are often indicated for patients who have a reduced gastrointestinal absorptive surface or exocrine pancreatic insufficiencies. A few of the clinical indications for elemental formulas include: pancreatitis, short gut syndrome, radiation enteritis, GI cutaneous fistulas and Crohn's disease. For some patients, they may also be useful as a transition feeding or even replace total parenteral nutrition (TPN). This recommendation is based on recent clinical findings that demonstrate elemental diets when compared to TPN result in fewer complications, reduced patient length of stay in the ICU and are less expensive. Elemental diets are composed of low molecular weight nutrients and require minimal digestive and absorptive capability. The protein source consists of free amino acids and contains essential and non-essential amino acids. Carbohydrate is typically composed of glucose and hydrolyzed cornstarch (maltodextrin) while the fat content is usually low and primarily consists of essential fatty acids. These diets have minimal residue because of the efficient absorption of the nutrients provided in an elemental form. Most practitioners find that initiating feeding at full strength using low delivery rates, is well tolerated, even though elemental formulas are, by nature, hyperosmolar (greater than 300 mOsm/Kg $H_2O$). However, in selected cases, initiating feeding with a dilute formula may be preferred. Elemental diets are often administered by needle catheter jejunostomy or endoscopically placed percutaneous jejunal tubes (PEJ) or nasoenteric small bowel feeding tubes in the critically ill patient.

ISOCAL is an enteral formulation by Mead Johnson which utilizes casein and soy for its protein source, glucose oligosacchrides for its carbohydrate source and soy oil and medium chain triglycerides (MCT) oil for its lipid source.

OSMOLITE is manufactured by Ross and utilizes as its protein source casein and soy, corn starch for its carbohydrate source and fifty percent MCT oil, forty percent corn oil and ten percent soy oil for its lipid source.

ENSURE is manufactured by Ross and utilizes casein and soy for protein source, corn starch and sucrose for a carbohydrate source and corn oil for a lipid source.

SUSTACAL manufactured by Mead Johnson utilizes casein and soy for its protein source, corn syrup and sucrose for its carbohydrate source and soy oil for its lipid source.

ENSURE PLUS manufactured by Ross is a high protein, high calorie composition using soy and casein for its protein source, corn starch and glucose for its carbohydrate source and corn oil for its lipid source.

MAGNACAL manufactured by Sherwood Medical is a high density composition with 2.0 calories/ml. MAGNACAL utilizes casein for its protein source, corn syrup for its carbohydrate source and soy oil for its lipid source.

TRAUMACAL manufactured by Mead Johnson utilizes casein for its protein source, corn syrup and sucrose for its carbohydrate source and 70 percent soy bean oil. and 30 percent MCT oil for its lipid source.

ISOTEIN HN is manufactured by Sandoz and utilizes lactalbumin for its protein source, maltodextrin for its carbohydrate source and soy oil and MCT oil for its lipid source.

VIVONEX T.E.N. is manufactured by Sandoz and comprises branched chain amino acids, glutamine and arginine as the protein source, safflower oil as the lipid source, and maltodextrin and modified starch as the carbohydrate source.

IMPACT is manufactured by Sandoz and comprises arginine and caseinates as the protein source, maltodextrins as the carbohydrate, and menhaden oil and structured lipids as the lipids source.

U.S. Pat. No. 4,752,618 describes a dietary supplement and method of minimizing infections therewith, comprising omega-3 and omega-6 fatty acid such as safflower oil and menhaden oil.

U.S. Pat. No. 4,847,296 describes triglyceride preparations for enteral administration. to prevent catabolism and increase protein synthesis in subjects undergoing severe metabolic stress.

U.S. Pat. No. 5,053,387 describes enteral compositions for treating traumatic injury comprising an intact protein (from lactalbumin egg albumen or whey and the like), arginine, carbohydrate (glucose polymers, disaccharides, starches and the like), lipid comprising omega-3 fatty acids of fish oil, and necessary vitamins and minerals.

U.S. Pat. No, 5,231,085 describes enteral compositions comprising arginine, ornithine, a nucleobase, omega-3 polyunsaturated fatty acids, and omega-6 polyunsaturated fatty acids.

Other background references on enteral feeding compositions and methods include:

Alexander, J. W., MacMillan, B. G., Stinnett. J. P. et al: Beneficial effects of aggressive protein feeding in severely burned children. Ann. Surg. 192:505–517, 1980;

Dominioni, L., Trocki, O., Mochizuke, H., et al: Prevention of severe postburn hypermetabolism and catabolism by immediate intragastric feeding. J. Burn Care Rehab. 5:106–112, 1984;

Bower, R. H., Muggia-Sullam, M., Vallgren, S., et al: Branched chain amino acid enriched solutions in the septic patient. A randomized. prospective trial. Ann. Surg. 203: 13–20, 1986;

Cerra, F. G., Siegal, J. H., Coleman, B., et al: Septic autocannibalism: A failure of exogenous nutritional support. Ann. Surg. 192:570–580. 1980;

Cerra, F. B., Upson, D., Angelico, R., et al: Branched chains support post-operative protein synthesis. Surgery 92:192–198, 1982;

Cerra, F. B. Shronts, E. P., Konstantinides, N. N., et al: Enteral feeding in sepsis: A prospective randomized, double-blind trial. Surgery 98:632–638, 1985;

Law, D. K., Durdick, S. J. and abdon, N. I.: The effect of dietary protein depletion on immuno competence: the importance of nutritional repletion prior to immunologic induction. Ann. Surg. 179:168–173, 1974;

Dominioni, L., Trocki, O., Fang, C. H., and Alexander, J. W.: Nitrogen balance and liver changes in burned guinea pigs under going prolonged high protein enteral feeding. Surg. Forum 34:99–101, 1983;

Food and Nutrition Board, National Research Council, Recommended Dietary Allowances, 10th edition. Washington, D.C., National Academy of Sciences, 1989; and Donnelly, M. and Scheffler, I. E.: Energy metabolism in respiratory deficient and mild type Chinese hamster fibroblasts in culture. J. Cell Physical. 89:39–51, 1976.

Improvements to the enteral feeding compositions are continually sought to provide greater patient benefits. It is the object of the present invention to provide an improved enteral nutritional composition that is nutritionally balanced and which provide complete nutritional support for critically ill patients.

SUMMARY OF THE INVENTION

The present invention relates to an enteral nutritional composition comprising based on total caloric content of said composition, a) from 4 to 30% lipid component, b) from 65 to 80% carbohydrate component, and c) from 16 to 25% protein component, said protein component comprising based on the free base 14 to 30% by weight glutamine and 5 to 33% by weight arginine, said glutamine and arginine being in free base form, ingestible salt form, partially hydrolyzed protein form or intact protein form, wherein said composition has a nonprotein calorie to grams of nitrogen ratio ranging from 150:1 to 80:1.

The composition can be in the form of a solid powder (which is subsequently mixed with water or other suitable liquid carriers) or in the form of a ready-to-use homogenous aqueous liquid. The composition is useful in the dietary management of stress, trauma, burns, malnutrition, sepsis, inflammatory bowel disease, cancer, intestinal atresia, pancreatitis, fistula, short-gut syndrome, acquired immunodeficiency syndrome, cachexia, and other stressed and catabolic conditions.

It is a further object of this invention to provide an improved enteral feeding composition having higher total nitrogen, lower ratio of nonprotein calorie to gram of nitrogen ratio and improved amino acid profile. It is another object of this invention to provide improved enteral feeding composition containing carnitine and taurine and the resultant benefits therefrom. It is an even further object of this invention to provide a method of treating stressed catabolic patients by enteral administration of the improved feeding compositions of this invention.

DETAILED DESCRIPTION

This invention relates to improved enteral nutritional compositions which are useful in treating stressed and catabolic conditions. The enteral nutritional composition of this invention comprises, based on total caloric content of said composition, a) from 4 to 30% lipid component, b) from 65 to 80% carbohydrate component, and c) from 16 to 25% protein component, said protein component comprising based on the free base 14 to 30% by weight glutamine and 5 to 33% by weight arginine, said glutamine and arginine being in free base form, ingestible salt form, partially hydrolyzed protein form or intact protein form, wherein said composition has a nonprotein calorie to grams of nitrogen ratio ranging from 150:1 to 80:1.

The composition comprises based on total calories from 4–30% (preferably about 6%) lipid component. Adequate fat intake is important as a source of energy, essential fatty acids and carrier of fat soluble vitamins. Relatively low levels of fat (i.e., <3% calories) may be inadequate on a long-term basis (i.e., >2 weeks) to prevent essential fatty acid deficiency. Suitable lipids for use in the present invention include, any of the conventional saturated and unsaturated fatty acids, glycerides and other nutritionally acceptable fat sources known in the art, such as animal oils, fish oils, vegetable oils and synthetic lipids. Lipid sources include, for example, medium chain triglycerides, corn oil, soybean oil, peanut oil, olive oil, safflower oil, sunflower oil, cotton oil, canola oil and the like. The most preferred lipid sources are safflower oil, canola oil and soybean oil.

Preferably, the lipid component of the composition of this. invention comprises, based on total caloric content of the composition, 4 to 10% of long chain fatty acids having about 14–24 carbon atoms and 0 to 20% of medium chain triglycerides having fatty acid chains of about 6–12 carbon atoms.

The lipid component preferably comprises omega-6 polyunsaturated fatty acids (i.e., linoleic acid) at 2–4% of total calories and omega-3 polyunsaturated fatty acids (i. e., linolenic acid) at 0.2–1.0% of total calories.

The level Of total lipid in the preferred composition is 4–30% (preferably about 6%) of calories which provides about 6.7 grams of lipid per liter. This level ensures adequate levels of essential fatty acids in the diet, particularly for those patients who receive smaller volumes (fewer calories) of formula. The use of canola or soybean oil allows for the addition of the omega-3 fatty acid, alpha-linoleic acid. This level will meet the nutrient needs of alpha-linolenic and linoleic acid and limit the possible negative effects of high fat formulas which include malabsorption, diarrhea and suppression of the immune system.

The composition of the invention comprises, based on total caloric content, from 65 to 80% carbohydrate component, preferably about 76%. Suitable carbohydrate sources for the. carbohydrate component can be those conventionally known and used in enteral feeding compositions. Sources of carbohydrate include, for example, cereals, vegetables, starches, glucoses, disaccharides, maltodextrins and the like. The preferred carbohydrates are maltodextrins and modified or hydrolyzed starches. The most preferred compositions of this invention in liquid form comprises about 190 grams of carbohydrate per liter.

The composition of the invention comprises, based on total caloric content, from 16 to 25% protein component, preferably about 18%. Suitable protein sources for the protein component can include conventional sources of intact protein, protein hydrolysates and crystalline amino acids used in enteral feeding compositions such as, for example, casein, soy, lactalbumin, egg albumen, whey and the like. The protein component of the claimed composition comprises based on free base 14 to 30% (preferably 22–23%) by weight glutamine and 5 to 33% (preferably 11–12%) by weight arginine. The glutamine and arginine can be in free base form, ingestible salt form, partially hydrolyzed protein form or intact protein form. Preferably, the composition comprises, based on total caloric content of the composition, arginine ranging from 1 to 6% based on the free base.

The constituents of protein are amino acids. All amino acids are obtained directly or indirectly from dietary protein or amino acids. Furthermore, the amino acids are utilized concomitantly for synthesis of tissue protein. No protein is stored in the body. There are two kinds of amino acids. Essential amino acids must be supplied by diet, where as nonessential amino acids can be produced by the body. Of the 22 identified amino acids, 9 are considered essential for infants and 8 have been designated essential for children and adults. Essential amino acids are not more important than non essential amino acids in the metabolic process. The distinction between the two protein groups is the necessity for dietary sources of essential amino acids. Other nutrients can be omitted from the diet of a well-nourished person and have little or no immediate effect on growth or appetite. Omission of a single amino acid from the diet or consumption of a diet with an imbalanced amino acid pattern results immediately in failure of the body to use all other amino acids except as an energy source. Dietary proteins vary greatly in amino acid composition.

Those proteins possessing an assortment of essential amino acids most nearly matching the body's protein requirements are considered to be of the highest biological value and will meet normal protein synthesis needs. Proteins derived from animal origin (especially eggs and milk) have the highest biological value, but vegetable protein foods can be combined in such a way that the overall amino acid composition of the mixture has a nutritional value comparable to that of "good animal protein". Proteins that have amino acid profiles with high biological value will meet normal protein syntheses needs. Radical alteration in amino acid intake, particularly if the concurrent energy intake is marginal, can result in a compromised environment for protein synthesis. The proportion of essential amino acids in total protein should be at least about 40% in order to promote tissue restitution.

The composition of this invention has maintained its ratio of essential to nonessential amino acid even though arginine and glutamine have been added. This critical balance has been maintained through selected and careful calculations of each amino acid and has allowed for an amino acid profile which is considered to be of high biological value.

The amount and type of protein is vital to the critically ill patient. Attention should be paid to the amino acid composition, nitrogen needs as they relate to energy needs, and the metabolic changes of these patients. In general, protein requirements are elevated post-injury due to increased losses and greater needs for anabolism and tissue repair. Studies have shown that enteral fortification employing sufficient quantities of protein can accelerate the synthesis of visceral proteins and promote positive nitrogen balance and host defense factors.

Protein needs are tied to energy needs. The typical American diet reflects a nonprotein calorie (NPC) to grams of nitrogen (N) ratio of approximately 200 to 300:1, and the RDA is 0.8 gm/kg of body weight per day. The recovery from injury or illness is a dynamic process that varies among individuals. The metabolic response is a result of several factors, including the individuals' previous state of health, the extent of the injury, the type of surgical procedure required, and the type and extend of complications. Recovery also depends on the nutritional status of the individual. Because caloric expenditures and nitrogen excretion are effected in parallel to stress, both the caloric intake and nitrogen content of the diet are examined together. Precise recommendations for protein allowance in critical care can vary and the present composition has NPC:N ranging from 150:1 to 80:1, depending on degree of protein depletion and severity of injury. The composition of this invention has increased its total nitrogen content (% of calories) and lowered its NPC:N. The nitrogen content of the composition can be calculated or measured using a variety of techniques such as described in *Proteins—A Guide to Study by Physical and Chemical Methods*, R. Haschemeyer, et al., John Wiley & Sons, p. 51, (1973) the disclosure of which is herein incorporated by reference.

Most enteral formulas use hydrolyzed cornstarch as the carbohydrate source. The degree of hydrolysis contributed to the formulas' osmolality, severeness and digestibility. The carbohydrate source in the preferred compositions of this invention comprise 96% hydrolyzed cornstarch and 4% modified starch. The preferred amount of carbohydrate is about 190 grams per liter providing about 76% of the total calories. The relatively lower carbohydrate source allows for increased levels of nitrogen and yet maintain a "moderate osmolality". The carbohydrate source is preferably free from lactose, (which may be a problem in the critically ill due to lactose intolerance) and preferably contains no sucrose, fructose or dietary fiber.

Arginine is included in the compositions of this invention although it is classified as a nonessential amino acid. It is not considered to be an essential dietary constituent for humans in the normal, unstressed human; the urea cycle provides sufficient arginine for maintenance. However, endogenous biosynthesis of arginine may not be sufficient for maximal tissue regeneration or positive nitrogen balance in trauma or stress. Dietary arginine enrichment may diminish protein catabolism and hence, reduce urinary nitrogen excretion in trauma or stress and improve immune function.

The level of arginine in the preferred composition is about 1–6% (more preferably about 2%) of calories providing about 5 grams per liter. The arginine level is based on experiments (for example, using a third degree 30% body surface area burn model in guinea pigs) which demonstrated that diets containing about 2% arginineo increased survival, improved delayed hypersensitivity as examined by dinitroflurobenzene, and heightened local bacterial containment as assessed by the size of the pustules after intradural staphylococcal injections. It has also been shown that plasma arginine concentrations had a high correlation with a number of parameters indicating resistance to infection, such as total protein, albumin, transferrin, C3 levels and opsonic index in severely burned children. Studies of surgical patients found that supplemental arginine significantly enhanced lymphocyte blastogeneses and increased CD4 phenotype (% T cells) postoperatively. The beneficial effect of arginine on the immune system appeared distinct from its more moderate effect on nitrogen balance.

Glutamine is utilized at a high rate by the intestinal cells in the basal state, while its uptake and metabolism increase even further in the course of catabolic illness. It has been proposed that glutamine deficiency may develop in the course of many catabolic diseases and that this deficiency may have an important impact on intestinal mucosal integrity and function. Increased uptake of glutamine by the gut in response to stress and critical illness spares glucose as an intestinal fuel.

Aside from glutamine's role in the gut, there is some evidence of other benefits: spares glucose as an intestinal fuel; supports release of gluconeogenic precursors; provides a respiratory fuel for fibroblasts and lymphoid tissue. Patients who are at high risk of developing glutamine "deficiency" may benefit from the incorporation of glutamine at 14–30% by weight of the protein component of the enteral nutritional composition of this invention.

Novel nutrients, such as carnitine, which under certain conditions may become essential, have been added to formulas. The daily requirement is unknown for mammalian species including humans. Carnitine is synthesized in the liver from the essential amino acids lysine and methionine. If the liver is impaired, it is possible that synthesis of carnitine may also be impaired. Since all of the long chain fatty acids supplied in the diet must be transported into the mitochondria via a carnitine pathway before they can be oxidized to produce energy, adequate levels of carnitine in the tissue are essential for this metabolic step. It has also been shown that carnitine improved the energy metabolism of patients receiving TPN support, and it improved muscle mass of hospitalized patients given supplemental carnitine. The typical carnitine intake of healthy adults on normal diets average 29–47 mg per day with a range of 0.18 to 319 mg per day. The preferred compositions of the invention comprise about 180 mg of carnitine or about 0.03% to about 0.05% by weight based on free base of carnitine per 1800 calories; said carnitine being in free base form or ingestible salt form.

Taurine, important for normal retinal development and in the synthesis of bile salts, may be essential for infants, children and perhaps critically ill adults. Some studies of patients with cystic fibrosis have shown improved fat absorption, growth, and weight gain following taurine supplementation of 30 mg/kg/day. Typical daily taurine intake is estimated to fall within a range of 9–372 mg per day. The preferred composition comprise about 360 mg taurine per 1800 calories or, based on free base, 0.07 to 0.09% by weight taurin; said taurine being in free base form or ingestible salt form.

In enteral nutrition support there is clearly a balance which must be maintained for: (1) the need to infuse nutrients into the patient and (2) the need to ensure that tolerance, absorption, and utilization of those nutrients are achieved. While it is recognized that meeting nutrient needs in lower volumes of formula is desirable, the nature of elemental formulas is such that concentrating nutrients inherently increases osmolar load. Hypertonic enteral formulas, especially when tube fed, may cause nausea, vomiting, cramping, abdominal distention and diarrhea in sensitive patients. The main determinants of the osmolality of a formula are simple carbohydrates, electrolytes and amino acids. Based on clinical experience the compromise of achieving a "moderate osmolality" and feeding appropriately 1800 to 2000 milliliters and 1800 to 2000 calories per day is acceptable for the compositions of the present invention.

The compositions of the invention can be in the form of a solid powder which is subsequently mixed with juices or other aqueous liquid or other flavoring agents. The solid powder form preferably has a caloric content from about 3 to about 4 calories per gram of the composition. The compositions can also be in the form of a ready-to-use aqueous liquid which preferably has a caloric content of about 1 calorie per milliliter. The aqueous compositions of the invention preferably have an osmolality of about 630–690 mOsm per kilogram of water.

The enteral nutritional compositions of this invention may be administered via a nasogastric, nasointestinal, esophagostomy, gastrostomy, or jejunostomy feeding tube. Because of its homogeneity and low viscosity, small bore feeding tubes (16 gauge catheter or #5 French tube) may be used to optimize patient tolerance. The diet should be given at room temperature by continuous drip technique, or using a suitable infusion pump. At the 1 calorie per ml dilution, the composition supplies most of the daily fluid requirements. Additional fluids should be given when necessary to maintain hydration and adequate urine output.

The compositions can also be administered orally as a flavored drink served chilled over ice.

the invention based on solid A preferred composition of the invention based on solid weight is as follows:

| INGREDIENT | AMOUNT (WT. %) |
| --- | --- |
| MALTODEXTRIN | 69.32 |
| L-GLUTAMINE | 3.773 |
| MODIFIED FOOD STARCH | 3.773 |
| L-LEUCINE | 2.547 |
| L-ARGININE ACETATE | 2.536 |
| SOYBEAN OIL | 2.505 |
| MAGNESIUM GLUCONATE | 1.729 |
| L-LYSINE ACETATE | 1.486 |
| L-VALINE | 1.273 |
| L-ISOLEUCINE | 1.273 |
| CALCIUM GLYCEROPHOSPHATE | 1.258 |
| L-PHENYLALANINE | 1.078 |
| L-METHIONINE | 0.9265 |
| CITRIC ACID | 0.7755 |
| L-THREONINE | 0.7114 |
| POTASSIUM CHLORIDE | 0.5450 |
| L-TYROSINE | 0.4569 |
| L-HISTIDINE MONOHYDROCHLORIDE | 0.4528 |
| SODIUM CITRATE | 0.4402 |
| L-ASPARTIC ACID | 0.4192 |
| L-PROLINE | 0.3878 |
| POTASSIUM CITRATE | 0.3668 |
| SODIUM PHOSPHATE DIBASIC | 0.2851 |
| L-TRYPTOPHAN | 0.2587 |
| L-SERINE | 0.2159 |
| CHOLINE BITARTRATE | 0.2154 |
| L-ALANINE | 0.1937 |
| GLYCINE | 0.1886 |
| POTASSIUM SORBATE | 0.1467 |
| POLYGLYCEROL ESTERS OF F.A. | 0.1308 |
| TAURINE | 0.08300 |
| VITAMIN E ACETATE | 0.05659 |
| ASCORBIC ACID | 0.05072 |
| L-CARNITINE | 0.04150 |
| BIOTIN | 0.01761 |
| ZINC SULFATE | 0.01572 |
| FERROUS SULFATE | 0.01404 |
| NIACINAMIDE | 0.01199 |
| VITAMIN A PALMITATE | 0.01006 |
| CALCIUM PANTOTHENATE | 0.006749 |
| CYANOCOBALAMIN | 0.003668 |
| COPPER GLUCONATE | 0.003668 |
| MANGANESE SULFATE | 0.002369 |
| FOLIC ACID | 0.002348 |
| VITAMIN K | 0.002306 |
| VITAMIN D | 0.001761 |
| PYRIDOXINE HYDROCHLORIDE | 0.001467 |
| POTASSIUM IODIDE | 0.001149 |
| RIBOFLAVIN | 0.001048 |
| THIAMIN HYDROCHLORIDE | 0.000950 |
| CHROMIC ACETATE | 0.000179 |
| SODIUM MOLYBDATE | 0.000159 |
| SODIUM SELENITE | 0.000055 |

The following examples are presented to demonstrate the present invention. The examples are intended to be illustrative and not limitative. The present invention includes the embodiments described and exemplified and equivalent embodiments.

EXAMPLE I

A composition within the scope of the present invention was prepared as follows:

A Fat Base composition was prepared having the following composition:

| Ingredient | (Wt %) |
|---|---|
| maltodextrin | 36.3000 |
| modified starch | 37.5000 |
| soybean oil | 24.9000 |
| polyglycerol ester | 1.3000 |

The Fat Base was prepared by:
1) Dissolving polyglycerol ester in warm deionized water;
2) Adding the solution from step 1 to a kettle containing 40 lbs. cold deionized water;
3) Adding maltodextrin and modified starch to the kettle, mixing well, and heating to 165° F.;
4) When maltodextrin, modified starch and emulsifier blend reach 165° F., add soybean oil and homogenize at 500 PSI second stage, 3000 PSI total.
5) Spray drying the product under the following conditions:
INLET 350°–435° F.
OUTLET 180°–220° F.
PRESSURE 1200°–2200 PSI
PRODUCT TEMPERATURE 150° F.

An Amino Acid Premix was prepared having the following composition:

| Ingredient | Wt. % |
|---|---|
| L-glutamine | 20.6609 |
| L-leucine | 13.9461 |
| L-arginine acetate | 13.8887 |
| L-lysine acetate | 8.1381 |
| L-isoleucine | 6.9731 |
| L-valine | 6.9731 |
| L-phenylalanine | 5.9033 |
| L-methionine | 5.0734 |
| L-threonine | 3.8957 |
| L-tyrosine | 2.5023 |
| L-histidine HCL | 2.4793 |
| L-aspartic acid | 2.2957 |
| L-proline | 2.1235 |
| L-tryptophan | 1.4164 |
| L-serine | 1.1823 |
| L-alanine | 1.0606 |
| glycine | 1.0330 |
| taurine | 0.4545 |

A Vitamin/Mineral Premix was prepared having the following composition:

| Ingredient | Wt. % |
|---|---|
| magnesium gluconate | 37.1184 |
| calcium glycerophosphate | 26.9952 |
| potassium chloride | 11.6979 |
| sodium citrate | 9.4483 |
| trace mineral premix* | 4.9576 |
| potassium sorbate | 3.1494 |
| maltodextrin | 2.2496 |
| ascorbic acid | 1.0888 |
| vitamin E acetate | 1.2148 |
| biotin | 0.3779 |
| zinc sulfate | 0.3374 |
| ferrous sulfate | 0.3014 |
| niacinamide B3 | 0.2574 |
| vitamin A palmitate | 0.2160 |
| calcium pantothenate | 0.1449 |
| cyanocobalamin B12 | 0.0787 |
| copper gluconate | 0.0787 |
| manganese sulfate | 0.0508 |
| folic acid | 0.0504 |
| vitamin K | 0.0495 |
| vitamin D | 0.0378 |
| pridoxine hydrochloride | 0.0315 |
| potassium iodide | 0.0247 |
| riboflavin | 0.0225 |
| thiamin hydrochloride | 0.0204 |

*The trace mineral premix comprised 99.8295% maldodextrin, 0.0776% chronic acetate, 0.0690% sodium molybdate and 0.0239% sodium selenite.

The following procedure was utilized in preparing the composition of the invention:

| INGREDIENT | Wt. % |
|---|---|
| MALTODEXTRIN | 65.33 |
| AMINO ACID PREMIX | 18.26 |
| FAT BASE | 10.06 |
| VITAMIN/MINERAL PREMIX | 4.659 |
| CITRIC ACID | 0.7756 |
| POTASSIUM CITRATE | 0.3668 |
| SODIUM PHOSPHATE DIBASIC | 0.2851 |
| CHOLINE BITARTRATE | 0.2154 |
| L-CARNITINE | 0.04150 |

Add 40.0 grams of maltodextrin to a mixer. Add 18.26 grams of the Amino. Acid Premix and 4.659 grams of the Vitamin/Mineral Premix to the mixer. Blend the following ingredients for ten minutes and add to the mixer:

| | |
|---|---|
| MALTODEXTRIN | 5.33 GMS |
| CHOLINE BITARTRATE | 0.215 GMS |
| POTASSIUM CITRATE | 0.367 GMS |
| CITRIC ACID | 0.776 GMS |
| L-CARNITINE | 0.042 GMS |
| SODIUM PHOSPHATE DIBASIC | 0.285 GMS |

Add 10.06 grams of the Fat Base and 20.00 grams of maltodextrin to the mixer and mix for 10 minutes.

We claim:
1. An enteral nutritional composition comprising, based on total caloric content of said composition,
a) from 4% to 30% lipid component,
b) from 65% to 80% carbohydrate component, and
c) from 16% to 25% protein component, wherein said protein component consists of free amino acids in free base or ingestible salt form and comprises based on the free base 22% to 30% by weight glutamine and 11% to 33 by weight arginine, and at least 40% by weight essential amino acids,
wherein said composition has a nonprotein calorie to grams of nitrogen ratio ranging from 150:1 to 80:1.
2. An enteral nutritional composition comprising, based on total caloric content of said composition,
a) from 4% to 30% lipid component,
b) from 65% to 80% carbohydrate component, and
c) from 16% to 25% protein component, wherein said protein component consists of free amino acids in free base or ingestible salt form and comprises, based on the free base, 22% to 23% by weight glutamine and 11% to 12% by weight arginine and at least 40% by weight essential amino acids,
wherein said composition has a nonprotein calorie to grams of nitrogen ratio raging from 150:1 to 80:1.
3. The composition of claims 1 or 2 wherein said lipid component comprises, based on total caloric content of said composition, 4% to 10% of 14– 24-carbon long chain fatty acids and 0 to 20% of medium chain triglycerides having fatty acid chains Of 6–12 carbon atoms.

4. The composition of claims 1 or 2 comprising about 6% of said lipid component, about 76% of said carbohydrate component and about 18% of said protein component.

5. The composition of claims 1 or 2 wherein said composition has a nonprotein calorie to grams of nitrogen ratio of about 115:1.

6. The composition of claims 1 or 2 wherein said composition is in the form of a solid powder.

7. The composition of claim 6 wherein said composition has a caloric content from about 3 to about 4 calories per gram of said composition.

8. The composition of claims 1 or 2 wherein said composition is in the form of an aqueous liquid.

9. The composition of claim 8 wherein said composition has a caloric content of about 1 calorie per milliliter.

10. The composition of claim 8 wherein said composition has an osmolality of from 630 to 690 mOsm per kilogram of water.

11. The composition of claims 1 or 2 comprising based on the free base form from 0.03% to 0.04% by weight carnitine and about 0.07% to about 0.09% by weight taurine; said carnitine and taurine being in free base form or ingestible salt form.

12. An enteral nutritional composition comprising, based on total caloric content of said composition, a) from 4% to 30% lipid component, b) from 65% to 80% carbohydrate component, and c) from 16% to 25% protein component, said protein component comprising, in free base form, ingestible salt form, partially hydrolyzed protein form or intact protein form, 14% to 30% by weight glutamine and 5% to 33% by weight arginine, based on the free base form, wherein said protein component contains an amino acid premix comprising about, based on total weight of said amino acid premix:

| Ingredient | Wt. % |
|---|---|
| L-glutamine | 20.6609 |
| L-leucine | 13.9461 |
| L-arginine acetate | 13.8887 |
| L-lysine acetate | 8.1381 |
| L-isoleucine | 6.9731 |
| L-valine | 6.9731 |
| L-phenylalanine | 5.9033 |
| L-methionine | 5.0734 |
| L-threonine | 3.8957 |
| L-tyrosine | 2.5023 |
| L-histidine HCl | 2.4793 |
| L-aspartic acid | 2.2957 |
| L-proline | 2.1235 |
| L-tryptophan | 1.4164 |
| L-serine | 1.1823 |
| L-alanine | 1.0606 |
| glycine | 1.0330 |
| taurine | 0.4545 | wherein said composition has a nonprotein calorie to grams of nitrogen ranging from 150:1 to 80:1; and wherein said composition comprises by weight, in free base form or ingestible salt form, about 0.03% to 0.04% by weight carnitine and about 0.07 to 0.09% by weight taurine, based on the free base form of said carnitine and said taurine.

13. The composition of claim 12 wherein said composition is in the form of a solid powder.

14. The composition of claim 13 wherein said composition has a caloric content from about 3 to about 4 calories per gram of said composition.

15. The composition of claim 12 wherein said composition is in the form of an aqueous liquid.

16. The composition of claim 15 wherein said composition has a caloric content of about 1 calorie per milliliter.

17. The composition of claim 15 having an osmolality of from about 630–690 mOsm per kilogram of water.

\* \* \* \* \*

US005504072B1

REEXAMINATION CERTIFICATE (3311th)
United States Patent [19]
Schmidl et al.

[11] B1 5,504,072
[45] Certificate Issued  *Aug. 26, 1997

[54] ENTERAL NUTRITIONAL COMPOSITION HAVING BALANCED AMINO ACID PROFILE

[75] Inventors: Mary K. Schmidl, Arden Hills; Candis Kvamme, Brooklyn Park, both of Minn.

[73] Assignee: Sandoz Nutrition Ltd., Berne, Switzerland

Reexamination Request:
No. 90/004,226, Apr. 23, 1996

Reexamination Certificate for:
Patent No.: 5,504,072
Issued: Apr. 2, 1996
Appl. No.: 387,038
Filed: Feb. 10, 1995

[*] Notice: The term of this patent shall not extend beyond the expiration date of Pat. No. 5,438,042.

Related U.S. Application Data

[63] Continuation of Ser. No. 134,226, Oct. 8, 1993, Pat. No. 5,438,042.

[51] Int. Cl.$^6$ .................. A61K 38/01; A61K 33/14; A23L 1/30; A23L 1/202
[52] U.S. Cl. .................. 514/21; 424/439; 424/600; 424/679; 424/709; 426/64; 426/72; 426/73; 514/2
[58] Field of Search ................ 514/2, 21, 773, 514/777; 424/439, 600, 679; 426/64, 72, 73

[56] References Cited

U.S. PATENT DOCUMENTS

| 3,697,287 | 10/1972 | Winitz | 426/73 |
| 3,698,912 | 10/1972 | Winitz | 426/656 |
| 3,701,666 | 10/1972 | Winitz | 426/311 |
| 5,039,704 | 8/1991 | Smith et al. | 514/563 |

OTHER PUBLICATIONS

Saito et al. "Metabolic & Immune Effects of Dietary Arginine Supplementation After Burn" Arch Surg. 122 784–789 1987.

Tolerex Prod. Literature Norwich–Eaton Pharmaceuticals 1988 Norwich NY.

Vivonex TEN Product Literature Norwich Eaton Pharmaceuticals Norwich NY 1983.

High Nitrogen Vivonex Prod. Lit. Norwich Eaton Pharm Norwich NY 1978.

Vivonex TEN Prod Lit. Sandoz Nutrition Corp, Minneapolis MN 1992.

Nirgiotis JG, Andrassy RJ. Preserving the gut and enhancing the immune response: the role of enteral nutrition in decreasing sepsis. *Contemp Surg.* 1992;41:17–26.

Alverdy JC, Aoys, E, Moss GS. Total parenteral nutrition promotes bacterial translocation for the gut. *Surgery.* 1988;104:185–190.

Moore FA, Feliciano DV, Andrassy RJ, et al. Early enteral feeding, compared with parenteral, reduces postoperative septic complications. *Ann of Surg.* 1992;216:172–183.

Hammarquist F, Wernerman J, Ali R, von der Decken A, Vinnars E. Addition of glutamine to total parenteral nutrition after elective abdominal surgery spares free glutamine in muscle, counteracts the fall in muscle protein synthesis, and improves nitrogen balance. *Ann of Surg.* 1989;209:455–461.

Stehele P, Zander J, Mertes N, Alkers S, Puchstein C, Lavin P, Furst P. Effect of parenteral glutamine peptide supplements on muscle glutamine loss and nitrogen balance after major surgery. *Lancet.* 1989;1–231–233.

Fox AD, Kripke SA, DePaula J, et al. Effect of a glutamine–supplemented enteral diet on methotrexate–induced enterocolitis. *JPEN.* 1988;12:325–331.

Barbul A. Arginine and immune function. *Nutrition.* 1990;6:53–62.

National Research Council Subcommittee on the tenth edition of the RDAs: Recommended Dietary Allowance ed. 10. Washington, DC: National Academy Press, 1989;pp. 46–51.

Moore EE, Jones TN. Benefits of immediate jejunostomy feeding after major abdominal trauma–a prospective, randomized study. *J. Trauma.* 1986;26:874–881.

Klimberg VS. Glutamine: a key factor in establishing and maintaining intestinal health. In: *Nutritional Support Strategies for the Catabolic Patient.* Proceedings from a symposium held at the 1990 American Dietetic Association Meeting, Oct. 16–18, 1990. Denver, Colo.

Andrassy RJ. Free amino acids and peptides–the pros and cons. In: *Nutritional Support Strategies for the Catabolic Patient.* Proceedings from a symposium held at the 1990 American Dietetic Association Meeting. Oct. 16–18, 1990. Denver, Colo.

Ziegler TR, Benfell K, Smith RJ, Young LS, Brocon E, Ferrari Baliviera E, Lowe DK, Wilmore DW. Safety and metabolic effects of L–glutamine administration in humans. *JPEN.* 1990;14:137–146.

O'Dwyer ST, Smith RJ, Kripke SA, et al. New fuels for the gut. In: Rombeau J. Caldwell M. *Clinical Nutrition: Enteral and Tube Feeding.* 2nd ed. Philadelphia, Pa: W.B. Saunders & Co.: 1990:chap 28.

Barbul A. Arginine: biochemistry, physiology and therapeutic implications. JPEN. 1986;10:227–238.

Leon P, Redmond HP, Stein TP, et al. Arginine supplementation improves histone and actuate–phase protein synthesis during gram–negative sepsis in the rat. *JPEN.* 1991;15:503–508.

(List continued on next page.)

*Primary Examiner*—Nancy J. Degen

[57] ABSTRACT

Enteral nutritional composition comprising 4–30% lipid component, 65–80% carbohydrate component and 16–25% protein component, based on total caloric content, wherein said protein comprises by weight 14–30% glutamine and 5–33% arginine and said composition has a nonprotein calorie to grams of nitrogen ratio of 150:1 to 80:1.

OTHER PUBLICATIONS

Gianotti L, Alexander JW, Pyles T, Furushima R. Arginine–supplemented diets improve survival in gut–derived sepsis and peritonitis by modulating bacterial clearance. Ann. of Surgery. 1993;217:455–461.

Bernard M, Forlaw. Complications and their prevention. In: Rombeau JL, Caldwell MD (eds) Clinical Nutrition: Enteral and Tube Feeding. 2nd ed. Philadelphia, Pa: W.B. Saunders & Co.: 1990:pp. 542–569.

Martindale RG, Andrassy RJ. Elemental nutrition overview. In: *Nutritional Support Strategies for the Catabolic Patient.* Proceedings from a symposium held at the 1990 American Dietetic Association Meeting. Oct. 16–18, 1990. Denver, Colo.

Klimberg VS, Souba WW, Dolson DJ, et al. Prophylactic glutamine protects the intestinal mucosa from radiation injury. *Cancer.* 1990;66:62–68.

Sitrin MD. Nutritional therapy for Crohn's disease: an overview. In: *Crohn's Disease: Nutrition as Adjunctive Therapy.* New Orleans, La:Aton Ochsner Medical Foundation 1989;1(1):3–8.

Specialized Elemental Nutrition With Glutamine. The Role of Alitraq™, 1991 Ross Laboratories, Mary Henningfield, PhD.

Inoue, et al., Journal of Parenteral and Enteral Nutrition, vol. 17, No. 2, pp. 165–170 (1993).

O'Dwyer, et al., Journal of Parenteral and Enteral Nutrition, vol. 13, No. 6, pp. 579–585 (1989).

Hwang, et al., Surgical Forum, vol. 37, pp. 56–58 (1986).

REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

The patentability of claims 1–11 is confirmed.

Claims 12–17 are cancelled.

* * * * *